Sept. 2, 1947. A. V. D. WILLGOOS 2,426,872
AIR COOLING FOR RADIAL ENGINES
Filed April 21, 1945 5 Sheets-Sheet 1

Inventor
Andrew V. D. Willgoos
by H. Hume Mathew
Attorney

Sept. 2, 1947.        A. V. D. WILLGOOS          2,426,872
           AIR COOLING FOR RADIAL ENGINES
              Filed April 21, 1945        5 Sheets-Sheet 3

Inventor
Andrew V. D. Willgoos
by H. Hume Mathews
        Attorney

Sept. 2, 1947. A. V. D. WILLGOOS 2,426,872
AIR COOLING FOR RADIAL ENGINES
Filed April 21, 1945 5 Sheets-Sheet 5

Inventor
Andrew V. D. Willgoos
by H. Hume Mathur
Attorney

Patented Sept. 2, 1947

2,426,872

UNITED STATES PATENT OFFICE 2,426,872

AIR COOLING FOR RADIAL ENGINES

Andrew V. D. Willgoos, West Hartford, Conn., assignor to United Aircraft Corporation, East Hartford, Conn., a corporation of Delaware Application April 21, 1945, Serial No. 589,585

6 Claims. (Cl. 123—171)

This invention relates to aircooled aircraft engines.

An object of this invention is to provide improvements in cooling for multi-row radial aircooled aircraft engines.

A further object of this invention is to provide improved means for minimizing the resistance or drag presented by a radial aircooled engine to the flow of engine cooling air and to provide a new combination and arrangement of inner and outer cowls, baffles, engine parts and engine attachments which produces improved cooling characteristics and other advantages particularly useful in multi-row aircraft engines of relatively high power output.

Other objects and advantages will be apparent from the specification and claims, and from the accompanying drawings which illustrate what is now considered to be a preferred embodiment of the invention.

Figure 1:
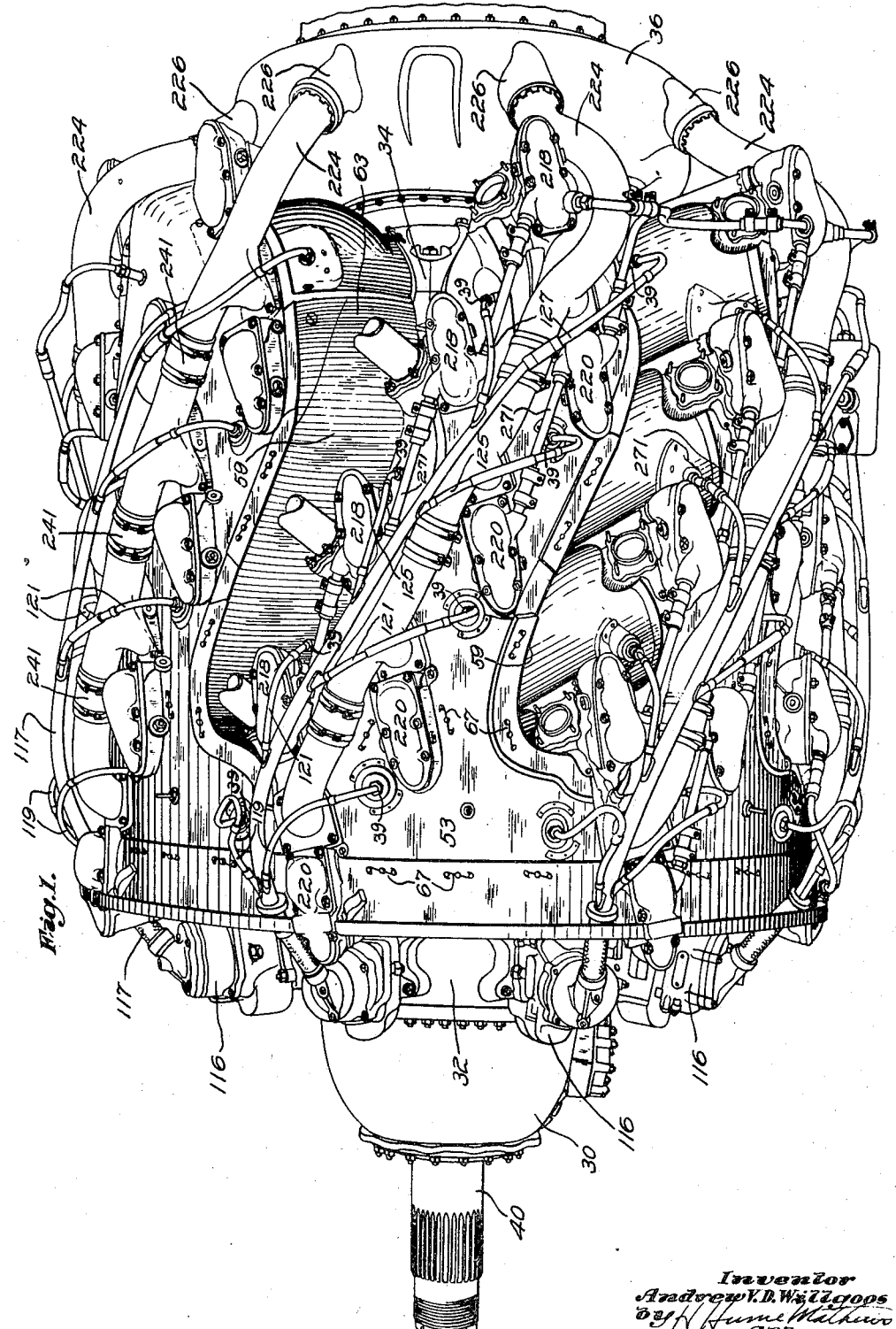
Fig. 1 is a perspective side view of an engine embodying this invention, including the inner cowl but with the outer cowl omitted.

The development of outer cowls for radial aircooled aircraft engines represented a major advance in the art and resulted in materially lowering the total drag of the aircraft, while permitting direct engine cooling by flight induced airflow. Outer cowls do not, however, eliminate the drag created by the flow of the engine cooling air over the engine and over piping, wiring and other engine parts, auxiliaries, and accessories.

According to this invention, which is particularly adapted for use with a four row radial aircooled engine, a new combination of engine parts, engine baffles and cowling confines the flow of engine cooling air past the engine to the finned sections of the cylinders and provides a relatively unobstructed path for the cooling airstream, so that it flows without material change in direction other than that caused by the deflection of the airstream around the sides of the cylinders. An inner cowl is provided which is spaced radially inwardly from the outer cowl, and the engine parts or attachments such as wiring, manifolds, oil piping and oil sumps are placed within an annular space between the inner and outer cowls, outside of the cooling air passages.

The drawings illustrate an embodiment of the invention as applied to an aircooled aircraft engine having four rows of cylinders with seven cylinders in each row. Referring to the drawings, Figs. 1 and 2, the engine comprises a propeller shaft housing section 30, a magneto drive housing section 32, a power section including a crankcase 34 and a rear section including a blower housing 36. Propeller shaft 40 is driven by the engine crankshaft (not shown) through a reduction gear within the nose section 30. For a detailed description of this engine, supplementing the general description given below, reference is made to Hobbs-Willgoos application Serial No. 552,372, filed September 1, 1944. Certain subject matter disclosed but not claimed in this application is claimed in the said Hobbs-Willgoos application Serial No. 552,372 and in the copending Hobbs application Serial No. 444,062, assigned to applicants' assignee.

Cylinders 215 are mounted on the crankcase 34 with corresponding cylinders of adjacent rows angularly offset to form helical cylinder banks. The twenty-eight cylinders are spaced around the crankshaft so that the projections of their centerlines on a plane normal to the crankshaft axis are equally spaced by $12^6/_7°$.

Figure 4:
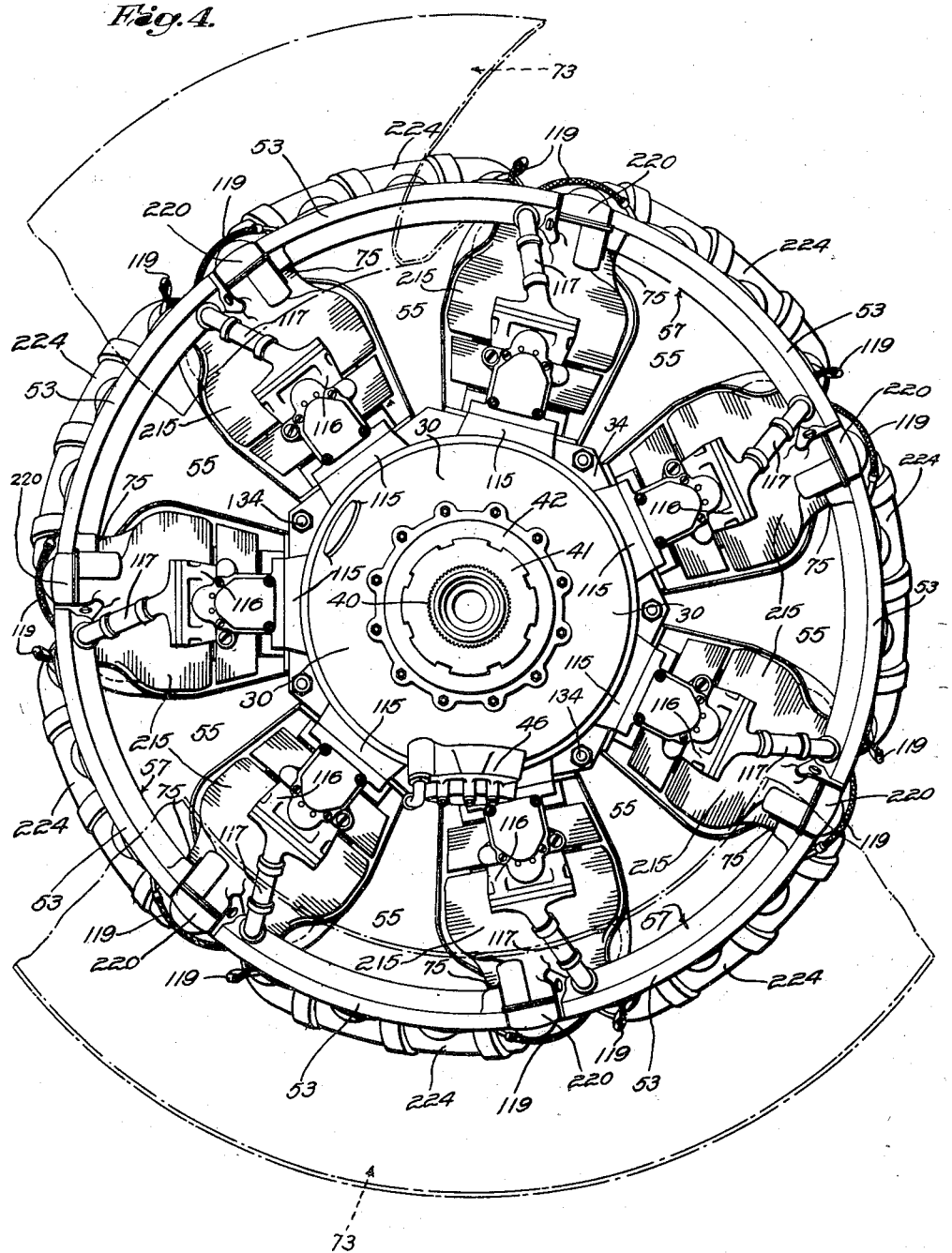
Fig. 4 is a front view of the engine of Fig. 1, including the inner cowl, the outer cowl (shown in broken lines) and omitting the three rear cylinder rows.
Figure 5:
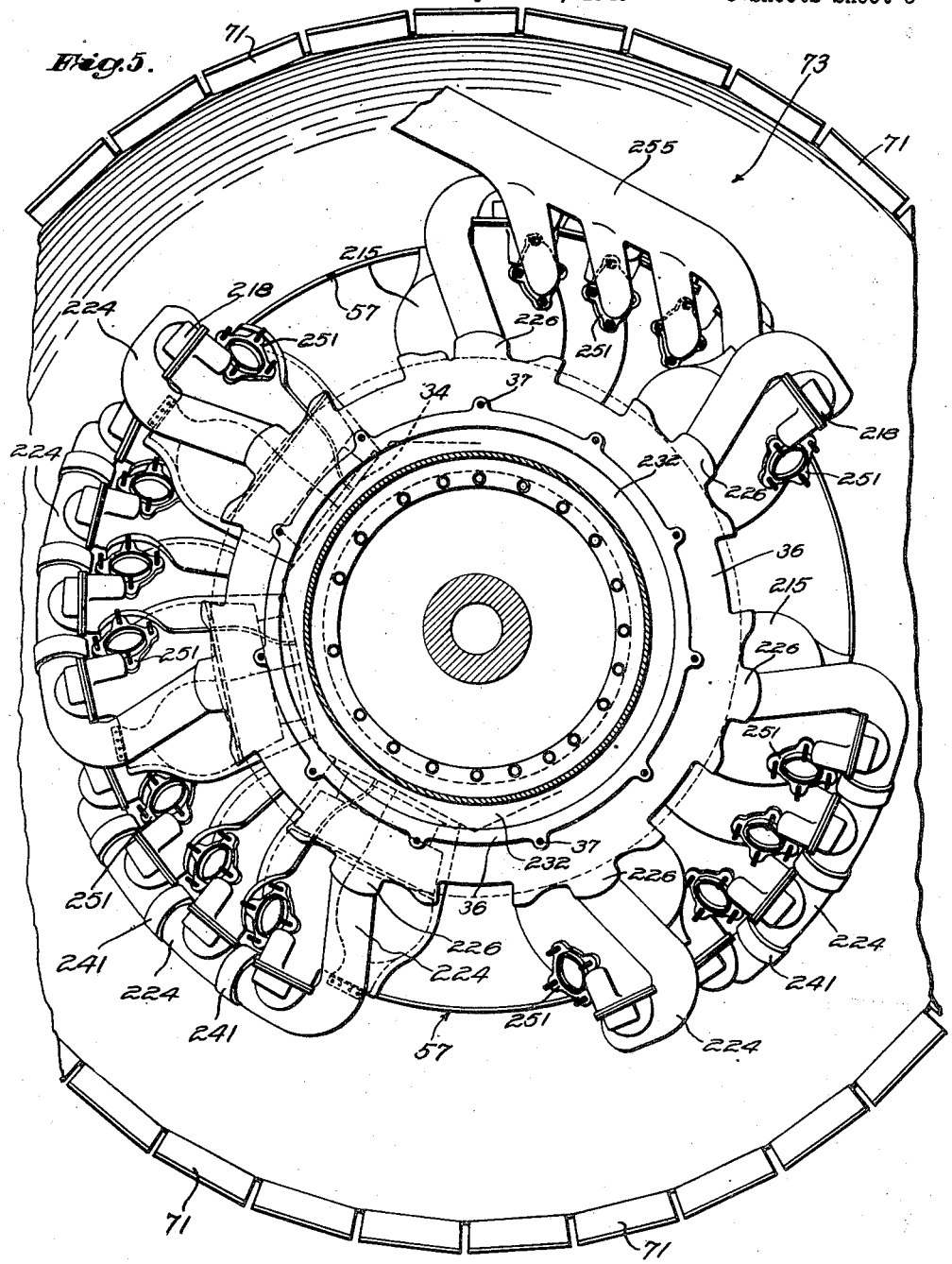
Fig. 5 is a rear view taken through the blower section of the engine of Fig. 1, with some engine parts omitted in order to simplify the drawing, and including the inner cowl, the outer cowl and cowl flaps.

Dual magnetos 116 mounted on pads 115 (Fig. 4) are aligned with each cylinder bank in front thereof, and at the rear of each bank is a blower outlet port 226 (Fig. 5) to which is attached an intake manifold 224 extending radially from a port 226 to the top of the corresponding rear cylinder and then along the top of the bank to the front cylinder thereof. Each manifold 224 is composed of four sections respectively connected to the four cylinders of the bank and which are interconnected by flexible sleeves 241 to form a continuous intake pipe.

Magnetos 116 have ignition manifolds 117 extending radially therefrom to the top of the front cylinder of the corresponding bank and then spirally along the top of the bank to the rear cylinder thereof. Manifolds 117 each comprise ignition wires 119, 121, 125 and 127 which respectively connect the magnetos with the front, front intermediate, rear intermediate, and rear cylinders of the corresponding banks.

Cylinders 215, which are specifically described and claimed in my applications Serial Nos. 444,032 and 444,033, have flat tops 75 between the symmetrically disposed fore and aft intake rocker boxes 220 and exhaust rocker boxes 218. A plane through the rocker box centers which includes the center of the cylinder head and the cylinder axis, forms an angle of 13½° with the crankshaft center line. The line of each bank, and therefore the line of the intake manifolds and ignition manifolds, runs helically or spirally with respect to the crankshaft axis, while the line of the rocker boxes, also extends at an angle to the crankshaft axis but transversely to the line of the cylinder banks. This arrangement enables manifolds 224 to be positioned between the rocker boxes (Fig. 1), thereby providing radial compactness and enabling the charging passages to be made of minimum length and resistance to airflow.

Figure 3:
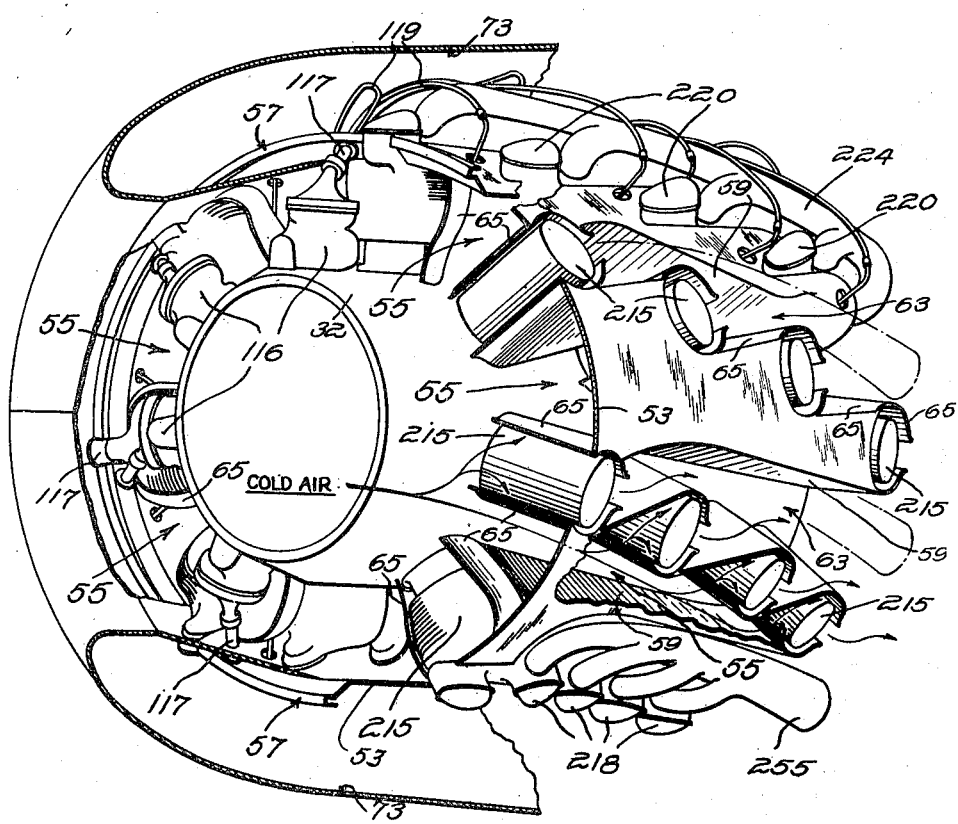
Fig. 3 is an isometric view of the engine of Fig. 1, showing schematically the relationship of the inner and outer cowls to the other engine parts.

Each bank of cylinders projects radially, like spokes of a wheel, from the generally cylindrical surface of the crankcase 34. An inner cowl 57, formed of gores or segments 53 which bridge the interbank spaces between the front row cylinders like the rim of a wheel and which rest on the flat tops 75 of the front row cylinders, forms with the exterior surface of crankcase 34 an annular cooling air entrance opening (Fig. 3) bridged by the front row cylinders for cooling air ducts 55 between adjacent cylinder banks. Sheet metal radial interbank baffles or bulkheads 59, which connect the front cylinders of the banks with the rear cylinders of adjacent banks, provide the rearwardly converging intake cooling air passages 55 along one side of each bank and also provide rearwardly diverging exhaust cooling air passages 63 along the other side of each bank. In the embodiment of the invention shown in the drawings, only the intake passages 55 are covered by the inner cowl segments 53, which extend circumferentially from one side of the top edge of each bulkhead 59 to the flat tops 75 of the cylinders in one of the adjacent cylinder banks. Segments 53 of the inner cowl do not cover the exhaust passages 63 and therefore the exhaust cooling air may flow radially as well as rearwardly in this form of the invention. However, it is within the scope of this invention to provide an inner cowl which completely bridges the interbank gaps between the cylinders of the three rear cylinder rows as well as between the cylinders of the front row, thus providing completely enclosed exhaust passages 63 as well as enclosed intake passage 55.

Inner cowl segments 53 are formed of pieces or plates flexibly connected to each other and to the bulkheads 59 and the cylinders 215 by detachable fasteners 67. Segments 53 completely bridge the interbank space between the cylinders of the front row and also bridge the spaces between the flat top surfaces of the cylinders in each bank. Thus, each segment and its associated bulkhead 61 (which are connected along their adjacent longitudinal edges by overlapped flanges secured by fasteners 67) form a channel of L-shaped cross-section having the free edge of one leg in substantially fluidtight contact with the outer surface of the crankcase and having the free edge of the other leg in substantially fluidtight contact with the flat cylinder tops 75 of the corresponding cylinder bank.

Intercylinder shrouds or baffles 65 are clamped around each cylinder and bulkheads 59 are fastened to the front row and rear row cylinder baffles. Filler plates (Fig. 3) are provided to bridge the gaps between the cylinders in each bank and, together with the front and rear cylinder baffles 65, form guides extending between the inner surface of inner cowl 57 and the outer surface of crankcase 34 for confining the cooling air flowing from intake passages 55 to exhaust passages 63 to the spaces between the cylinder cooling fins. The passages 55, formed by the segments 53, the outer surface of crankcase 45 and bulkheads 59, are closed at their rear ends so that substantially all cooling air entering these passages must flow around the sides of the cylinders between the interfin spaces. No cooling air flows over the tops of the cylinders, such flow being blocked off by the inner cowl at the level of the flat cylinder tops 75.

With the structural arrangement described above, cylinders 215 may be substantially completely covered with parallel fins from the flat tops 75 to approximately the outer surface of the crankcase. The spaces between these fins are supplied with cooling air by cylinder baffles 65 from unobstructed enclosed passages 55, and the cooling airstream flows longitudinally of the engine in substantially a straight path, into intake passages 55, across the cylinder banks through the interfin spaces, and into exhaust passages 63. The exhaust or heated air may then flow radially as well as longitudinally to the annular exit gill passage 69, between flaps 71, pivoted to a fixed outer cowl 73, and the fixed firewall 129.

Figure 2:
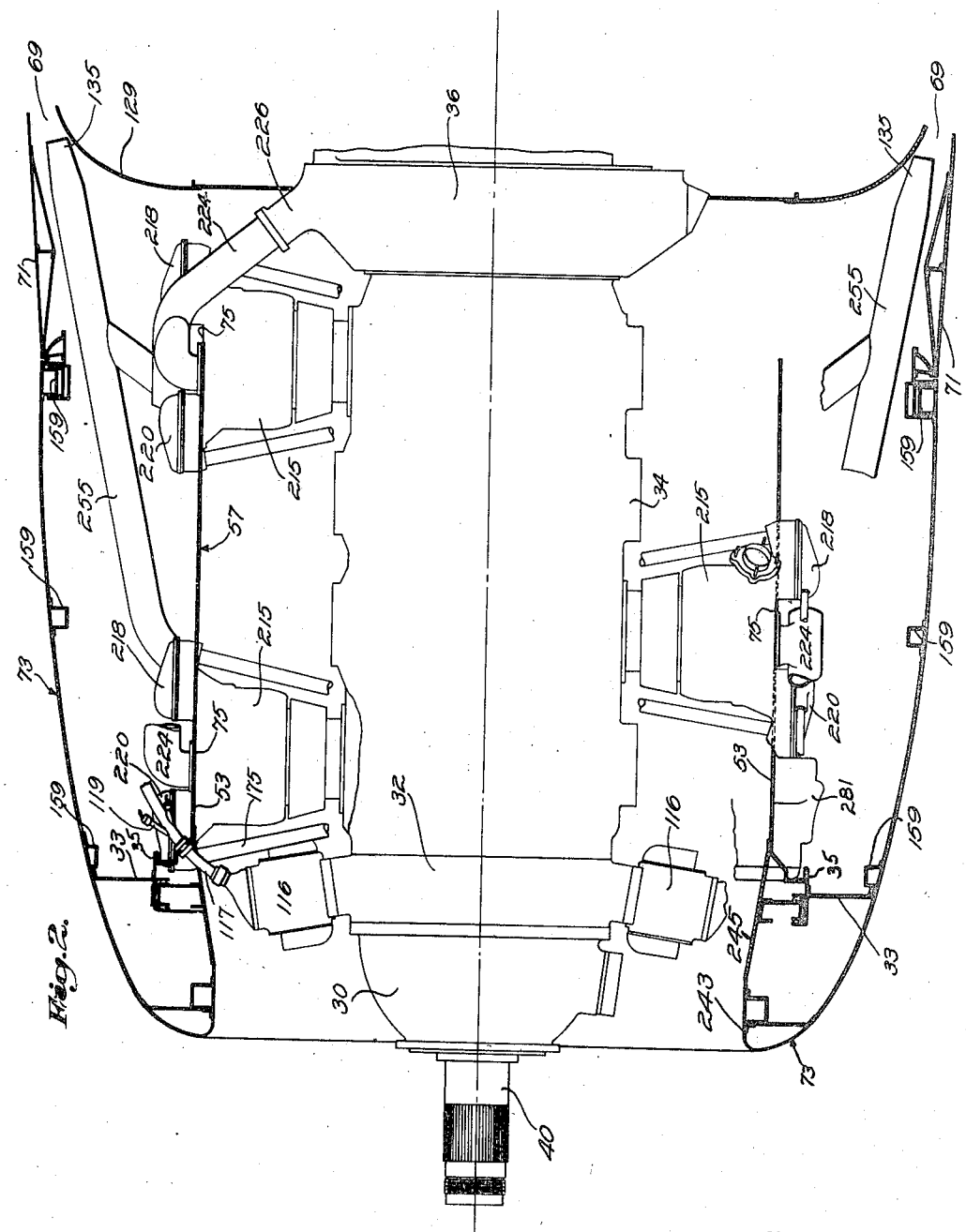
Fig. 2 is a schematic side view, partly in section, of the engine of Fig. 1, including the inner and outer cowls but with some of the engine parts omitted to simplify the drawing.

The engine exhaust manifolds 255, each comprising a single pipe connected to all the cylinders of a corresponding bank, discharge through nozzles 135 into the exit gills to form ejectors for augmenting the flow of cooling air by the residual energy of the engine exhaust gas. As best shown in Fig. 2, exhaust manifolds 255 are positioned almost wholly radially outward of the inner cowl 57. If desired, the pipes 224, 255 may be slightly altered in shape and interchanged, so that the intake manifold 224 is connected to the cylinder side ports and the exhaust manifold 255 is connected to the top cylinder ports, in which event the engine cylinder valves would be reversed so that the top ports serve as exhaust ports and the side ports as intake ports.

Outer cowl 73 may include a cylindrical entrance portion 243 merging into a conical diverging portion 245 having a circular rear edge cooperating with the front edges of the segments 53 for admitting air to the inner cowl. Cut-outs in the cone 245 provide for the projection of valve push rod cover tubes 175 and the ignition manifolds 117 therethrough. The front of the outer cowl 73 is curved around to meet the front edge of the cylindrical portion 243. As a matter of practice, outer cowl portions 243, 245 may be made integral with the outer cowl 73 or may be omitted; in any event, the inner and outer cowls are formed with smoothly curved inner and outer surfaces, respectively, to provide streamlined or laminar airflow both through and over the inner and outer cowls. Outer cowl 73 is reinforced by annular ribs 159 on the interior surface thereof and may be supported from the engine by struts (not shown) and by an annular wall, shown at 33, from the inner cowl 57, which in turn is fixed to and supported by the engine cylinders. The forward end of inner cowl 57 is turned outwardly and is sealed at 35 to wall 33, to prevent airflow between the intake and exhaust cooling air passages except by way of the cylinder interfin spaces.

With the novel cowling and engine arrangement described above the intake manifolds, ignition manifolds, rocker boxes, and like engine parts are positioned in a relatively dead air space, outside of the inner cowl 57 and inside of the outer cowl 73, which is generally concentric with and radially spaced from the inner cowl 57. The rocker boxes 218, 220 project through inner cowl 57 enabling the rocker box intercylinder drain oil pipes 271 and oil sumps connected thereto (one of which is shown at 281) to be also positioned in the annular dead air space between the inner and outer cowls.

Exhaust manifolds 255, while located radially outward of inner cowl 57, are circumferentially positioned over the exhaust passages 63 and therefore may be considered to be at least partially in the exhaust cooling airstream. However, this arrangement does not materially obstruct the cooling airflow, particularly because the exhaust cooling air may flow radially as well as longitudinally as it issues from the intercylinder baffles. Further, it is within the scope of this invention to provide a continuous inner cowl at the rear, as well as at the front of the engine, and in this event, the exhaust manifolds would be isolated or set off from the exhaust passages 63 as well as from the intake passages 55.

As shown in Fig. 1, spark plugs 39 are located on opposite sides of each cylinder on planes approximately 90° to the planes including the rocker box centers and the cylinder axes. Some of these plugs are accessible by way of the exhaust passages 63 and the others are accessible through small openings in the inner cowl 57. It will be noted from Fig. 1 that the invention provides the important advantage that the rocker box mechanism, ignition manifolds, spark plugs, exhaust manifolds, intake manifolds, and rocker box scavenge oil lines and sumps may all be replaced or serviced without removing or disturbing the inner cowl, thus facilitating servicing of the engine.

It is to be understood that the invention is not limited to the specific embodiment herein illustrated and described, but may be used in other ways without departure from its spirit, as defined by the following claims.

I claim:

1. In an aircraft engine, a bank of cylinders, a radial bulkhead extending along one side of said cylinder bank, a circumferential wall portion connecting the top of said bulkhead and the tops of said cylinders and forming with said bulkhead a cooling air inlet passage for the cylinders in said bank, and a conduit connected with each of said cylinders extending along said cylinder bank radially outside of said cooling air passage.

2. In a cooling construction for a radial aircraft engine having aircooled cylinders arranged in at least four circumferential rows and in spiral banks, a longitudinal bulkhead extending from the rear cylinder of each bank to the front cylinder of an adjacent bank to form a cooling air passage for the cylinders of each bank, circumferentially extending baffle means extending substantially the full length of said air passages for closing the outer sides of said air passages, an outer cowl member around said engine spaced radially from said baffle means and having a circumferentially extending portion connected to said baffle means to form an annular seal therebetween, and conduits within said outer cowl connected with said cylinders and substantially isolated from said cooling air passages by said bulkheads and said baffle means.

3. In a cooling construction for a radial aircraft engine having aircooled cylinders arranged in at least four circumferential rows and in spiral banks, a longitudinal bulkhead extending from the rear cylinder of each bank to the front cylinder of an adjacent bank to form a cooling air inlet passage for the cylinders of each bank, circumferentially extending baffle means extending substantially the full length of said inlet passages for closing the outer sides of said inlet passages, an outer cowl member around said engine spaced radially from said baffle means and having a circumferential extending reentrant portion connected to said baffle means at the front edge thereof, and exhaust pipes within said outer cowl connected with said cylinders and substantially isolated from said cooling air inlet passages by said bulkheads and said baffle means.

4. In a cooling construction for a radial aircraft engine having aircooled cylinders arranged in at least four circumferential rows and in spiral banks, a longitudinal bulkhead extending from the rear cylinder of each bank to the front cylinder of an adjacent bank to form a cooling air inlet passage for the cylinders of each bank, circumferentially extending baffle means extending substantially the full length of said inlet passages for closing the outer sides of said inlet passages, an outer cowl member around said engine spaced radially from said baffle means and having a circumferential extending reentrant portion connected to said baffle means at the front edge thereof, valve rocker boxes having at least portions thereof located on the outside of said baffle means and within said outer cowl, and conduits connecting at least some of said rocker box portions.

5. In an aircraft engine, a bank of cylinders, a radial bulkhead extending along one side of said cylinder bank, a circumferential wall portion connecting the top of said bulkhead and the tops of said cylinders and forming with said bulkhead a cooling air inlet passage for the cylinders in said bank, a conduit connected with each of said cylinders extending along said cylinder bank radially outside of said cooling air passage, and a valve port passage in the top of each of said cylinders connected with said conduit.

6. In an aircraft engine, a bank of cylinders, a radial bulkhead extending along one side of said cylinder bank, a circumferential wall portion connecting the top of said bulkhead and the tops of said cylinders and forming with said bulkhead a cooling air inlet passage for the cylinders in said bank, a conduit connected with each of said cylinders extending along said cylinder bank radially outside of said cooling air passage, said conduit being connected with the tops of said cylinders, and a second conduit connected with the sides of said cylinders opposite said bulkhead.

ANDREW V. D. WILLGOOS.

REFERENCES CITED

The following references are of record in the file of this patent:

UNITED STATES PATENTS

| Number | Name | Date |
| --- | --- | --- |
| 1,896,222 | Chilton | Feb. 7, 1933 |
| 1,943,502 | Woolson | Jan. 16, 1934 |
| 2,070,842 | Reichel et al. | Feb. 16, 1937 |
| 2,170,974 | Parkins | Aug. 29, 1939 |
| 2,206,417 | Mercier | July 2, 1940 |
| 2,212,094 | Adolph | Aug. 20, 1940 |
| 2,270,912 | Theodorsen | Jan. 27, 1942 |
| 2,336,601 | Fedden et al. | Dec. 14, 1943 |
| 2,339,575 | Lee | Jan. 18, 1944 |
| 2,350,784 | Lohner et al. | June 6, 1944 |